United States Patent
Takahashi (10) Patent No.: US 9,390,332 B2
(45) Date of Patent: Jul. 12, 2016

(54) INFORMATION PROCESSING SYSTEM, INFORMATION PROCESSING METHOD AND PROGRAM

(71) Applicant: NEC Corporation, Tokyo (JP)

(72) Inventor: Yusuke Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/434,433

(22) PCT Filed: Aug. 15, 2013

(86) PCT No.: PCT/JP2013/071951
§ 371 (c)(1),
(2) Date: Apr. 9, 2015

(87) PCT Pub. No.: WO2014/061342
PCT Pub. Date: Apr. 24, 2014

(65) Prior Publication Data
US 2015/0294159 A1    Oct. 15, 2015

(30) Foreign Application Priority Data
Oct. 18, 2012    (JP) ................. 2012-231086

(51) Int. Cl.
| G06T 7/00 | (2006.01) |
| G06K 9/00 | (2006.01) |
| H04N 7/18 | (2006.01) |
| G06K 9/52 | (2006.01) |
| G06T 7/20 | (2006.01) |
| G08B 13/196 | (2006.01) |

(52) U.S. Cl.
CPC ........ *G06K 9/00718* (2013.01); *G06K 9/00771* (2013.01); *G06K 9/52* (2013.01); *G06T 7/004* (2013.01); *G06T 7/20* (2013.01); *H04N 7/181* (2013.01); *G08B 13/19608* (2013.01)

(58) Field of Classification Search
USPC ........................................ 382/103
See application file for complete search history.

(56) References Cited

U.S. PATENT DOCUMENTS

2004/0252194 A1* 12/2004 Lin ................. H04N 7/181
                                                         348/169
2010/0002082 A1*  1/2010 Buehler ........... G08B 13/19693
                                                         348/159

FOREIGN PATENT DOCUMENTS

| JP | 2004-266404 |   | 9/2004 |
| JP | 2004266404 A | * | 9/2004 |
| JP | 2008-219570 |   | 9/2008 |
| JP | 2008-537380 |   | 9/2008 |

OTHER PUBLICATIONS

International Search Report mailed Oct. 22, 2013 in corresponding PCT International Application.

* cited by examiner

*Primary Examiner* — Stephen R Koziol
*Assistant Examiner* — Delomia L Gilliard
(74) *Attorney, Agent, or Firm* — Finnegan, Henderson, Farabow, Garrett & Dunner, LLP (57) ABSTRACT

Provided are an information processing system, an information processing method and a program capable of suitably predicting, when tracking a person with a plurality of video cameras, an image of a video camera, in which a moving body that is appearing in a video camera will subsequently appear. The information processing system of the present invention includes an interior view angle person position acquisition unit 110 for identifying a traveling direction of a moving body appearing in an image of a first video camera among a plurality of video cameras, and an appearance probability calculation/sorting unit 150 for predicting, based on the traveling direction of the moving body in the image of the first video camera, one or more second video cameras in which a possibility of the moving body that is appearing in the image of the first video camera subsequently appearing is higher than other video cameras among the plurality of video cameras.

20 Claims, 7 Drawing Sheets

INFORMATION PROCESSING SYSTEM, INFORMATION PROCESSING METHOD AND PROGRAM

CROSS-REFERENCE TO RELATED PATENT APPLICATIONS

This application is a National Stage Entry of International Application No. PCT/JP2013/071951, filed Aug. 15, 2013, which claims priority from Japanese Patent Application No. 2012-231086, filed Oct. 18, 2012. The entire contents of the above-referenced applications are expressly incorporated herein by reference.

BACKGROUND

Modes pertaining to the present invention relate to an information processing system, an information processing method and a program.

In recent years, a system is being considered for performing wide-range monitoring by using videos (or images) captured with a plurality of cameras. For instance, Patent Document 1 discloses a device capable of appropriately tracking (monitoring) a person across cameras by using topology information between cameras. This device comprises a function of estimating the existence of topology between cameras by creating a histogram relating to a pair of a position (Out point) where the person disappeared from the camera view, and a position (In point) where the person subsequently appears in the camera view, and a function of displaying, through highlighting, an image of a camera in which the probability that the person will subsequently appear is high according to the topology.

Patent Document 1: Patent Publication JP-A-2008-219570

SUMMARY

Nevertheless, with the method described in Patent Document 1, unless the disappearance position of the person to be tracked is identified, it is not possible to identify the video camera where that person will subsequently appear. Thus, for instance, when the imaging positions of two video cameras are extremely close, there is a possibility that the person will enter the imaging range of the video camera and frame out (disappear) before being highlighted.

Some modes of the present invention were devised in view of the foregoing problems, and one object of the present invention is to provide an information processing system, an information processing method and a program capable of suitably predicting an image of a video camera in which a moving body appearing in a video camera will subsequently appear when tracking a person with a plurality of video cameras.

The information processing system according to the present invention comprises identification means for identifying a traveling direction of a moving body appearing in an image of a first video camera among a plurality of video cameras, and prediction means for predicting, based on the traveling direction of the moving body in the image of the first video camera, one or more second video cameras in which a possibility of the moving body that is appearing in the image of the first video camera subsequently appearing is higher than other video cameras among the plurality of video cameras.

The information processing method according to the present invention is an image processing method performed by an image processing system, the method including: a step of identifying a traveling direction of a moving body appearing in an image of a first video camera among a plurality of video cameras; and a step of predicting, based on the traveling direction of the moving body in the image of the first video camera, one or more second video cameras in which a possibility of the moving body that is appearing in the image of the first video camera subsequently appearing is higher than other video cameras among the plurality of video cameras.

The program according to the present invention causes a computer to execute processing of identifying a traveling direction of a moving body appearing in a image of a first video camera among a plurality of video cameras, and processing of predicting, based on the traveling direction of the moving body in the image of the first video camera, one or more second video cameras in which a possibility of the moving body that is appearing in the image of the first video camera subsequently appearing is higher than other video cameras among the plurality of video cameras.

Note that, in the present invention, terms such as "unit", "means", "device" and "system" do not simply refer to a physical means, and include cases of realizing, with software, the functions of such "unit", "means", "device" and "system". Moreover, the functions of one "unit", "means", "device" or "system" may be realized with two or more physical means or devices, and the functions of two or more "units", "means", "devices" or "systems" may be realized with one physical means or device.

According to the present invention, it is possible to provide an information processing system, an information processing method and a program capable of suitably predicting an image of a video camera in which a moving body appearing in a video camera will subsequently appear when tracking a person with a plurality of video cameras.

DETAILED DESCRIPTION

Embodiments of the present invention are now explained. The same or similar symbol is given to the same or similar configuration in the description of the drawings that will be explained and referenced below.

1 First Embodiment

FIG. 1 to FIG. 6 are diagrams explaining the first embodiment. This embodiment is now explained according to the following flow with reference to the foregoing diagrams.

Foremost, the outline of the system configuration is described in "1.1", and the outline of the operation is explained in "1.2" while referring to specific examples of a display screen and the like. Subsequently, the functional configuration of the system is described in "1.3", the processing flow is described in "1.4", and a specific example of the hardware configuration capable of realizing this system is described in "1.5". Finally, effects and the like of this embodiment are described in "1.6" onward.

(1.1 System Configuration)

Figure 1:
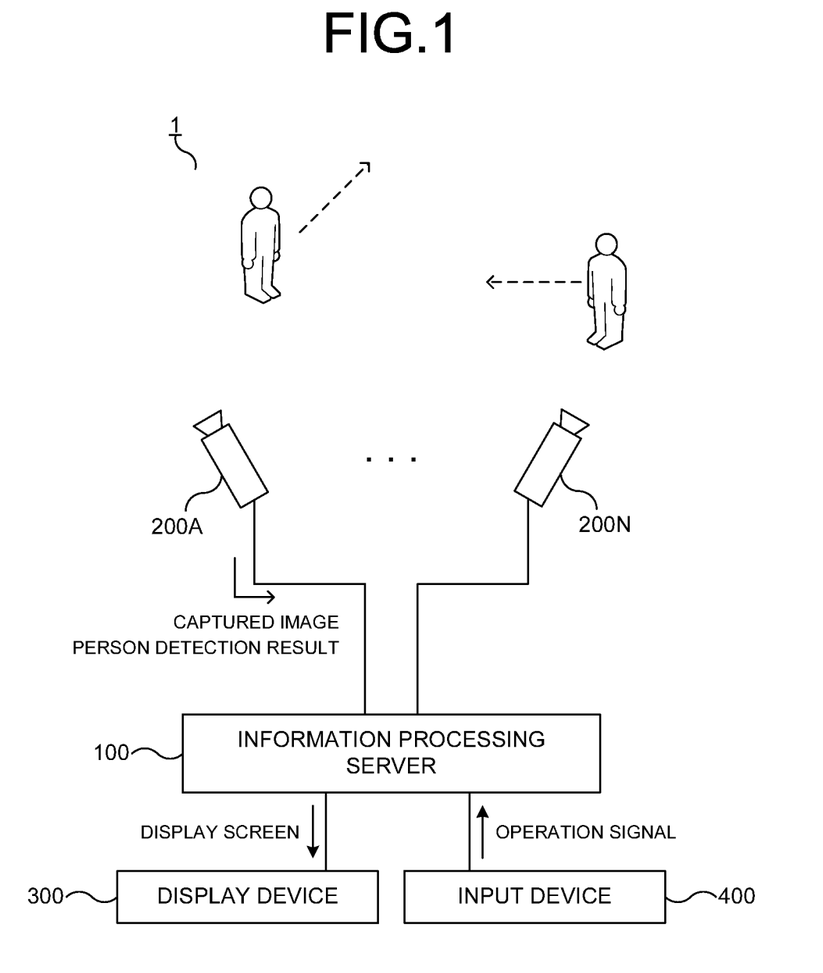
FIG. 1 is a functional block diagram showing a schematic configuration of the monitoring system according to the first embodiment.

The system configuration of the monitoring system 1 as the information processing system according to this embodiment is now explained with reference to FIG. 1. FIG. 1 is a block diagram showing the system configuration of the monitoring system 1.

The monitoring system 1 is generally configured from an information processing server 100, a plurality of video cameras 200 (video cameras 200A to 200N; hereinafter collectively referred to as the "video cameras 200"), a display device 300, and an input device 400.

In the ensuing explanation, the monitoring system 1 is explained as a system for monitoring (tracking) a person captured by the video cameras 200 as imaging apparatuses, but the object to be monitored is not limited thereto. For example, the object to be monitored may also be various moving bodies such as an automobile, a bicycle, or a motorcycle.

The video cameras 200 capture images (videos) and determine whether there is a person in the captured images, and send, together with the captured images, the person detection result including information such as the position (including the movement locus in the image) and feature quantity of the person in the image to the information processing server 100. Moreover, the video cameras 200 can track the person in the images (within the view angle) by comparing the captured images between frames.

Note that processing of detecting the person, extracting the feature quantity, and tracking the person in the camera does not need to be performed by the video cameras 200, and may also be performed, for example, by the information processing server 100 or another information processing apparatus not shown.

The information processing server 100 pervious various types of tracking processing including the next camera prediction of predicting in which video camera the person captured with the video camera 200 will subsequently appear by analyzing the images captured with the video cameras 200.

Note that the images to be processed with the information processing server 100 are not limited to the real-time images captured with the video cameras 200, it is also possible to track (analyze) the person based on the images that were stored in a storage device (for example, HDD (Hard Disk Drive) or VCR (Video Cassette Recorder)) after being captured with the video cameras 200.

In addition, it is also possible to track the person by playing the images stored in the storage device backwards (reverse playback). Normally, when a certain person engages in suspicious behavior, since it is necessary to check the path and the actions that the person had taken before the foregoing suspicious behavior, it is extremely useful to enable this kind of tracking based on reverse playback.

Figure 2:
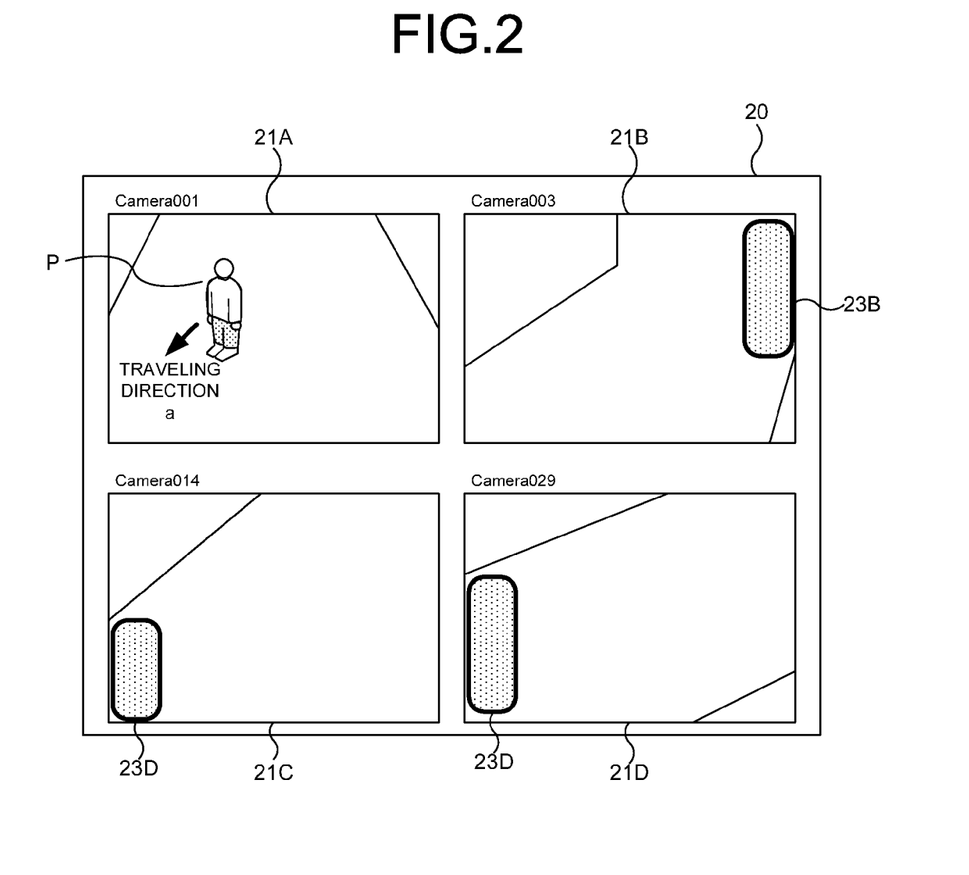
FIG. 2 is a diagram showing a specific example of the display screen.

In the person monitoring based on the information processing server 100, the information processing server 100 outputs various display screens such as a monitoring screen to the display device 300, and receives operation signals of various operation inputs pertaining to the person monitoring from the input device 400. More specifically, for example, by displaying a plurality of images input from the video cameras 200 on the monitoring screen displayed on the display device 300 (specific example is shown in FIG. 2 described later), the user as the monitor can comprehend the current location of the person to be monitored.

The user as the monitor can view the display device 300 and, when the person to be monitored appearing in the image (video) of a certain video camera 200 appears in an image of another video camera 200, operate the input device 400 and associate the two persons as the same person. The information processing server 100 can thereby identify the moving path of the person. Note that the information processing server 100 may also associate the persons, without manual operation, based on information such as the feature quantity of the person appearing in the images.

In addition, based on the traveling direction and speed of a person appearing in a certain video camera 200, the information processing server 100 additionally has the next camera prediction function of predicting in which video camera 200 that person will subsequently appear. Since this prediction is performed before the person frames out (disappears), even when the distance between the video cameras 200 is short, the user as the monitor can reliably prepare to monitor the subsequent video camera 200.

The display device 300 is a display for displaying images, for example, on a liquid crystal or an organic EL (Electro Luminescence). The display device 300 displays the monitoring screen that is output from the information processing server 100.

The input device 400 is a device to be used by the user (monitor) for inputting various types of information. For example, various pointing devices such as a mouse, a touch pad or a touch panel, or a keyboard or the like correspond to the input device 400. The various types of processing for registering the person to be monitored, associating the registered person and the person that appeared in the video camera 200 to the effect that they are the same person and the correction thereof are performed based on the user's operations input using the input device 400.

Note that various configurations may be considered for the information processing server 100, and the display device 300 and the input device 400. For example, the display device 300 and the input device 400 may be realized as one client, or, otherwise, the functions of the information processing server 100, the display device 300, and the input device 400 may be realized using three or more information processing apparatuses. Moreover, when the display device 300 and the input device 400 are realized as one client, a part of the functions of the information processing server 100 of this embodiment may be performed by the client.

(1.2 Explanation of Operation)

(1.2.1 Specific Example of Display Screen)

Foremost, a specific example of the display screen displayed on the display device 300 for person monitoring is explained with reference to FIG. 2. FIG. 2 is a diagram showing a specific example of the display screen (hereinafter referred to as the "monitoring screen 20") that is displayed by the display device 300 for person monitoring.

In the example of FIG. 2, the monitoring screen 20 includes image areas 21A to 21D (hereinafter collectively referred to as the "image areas 21") which respectively display the captured images input from a plurality of video cameras 200.

The image areas 21 display multi camera images input from a plurality of video cameras 200 as described above. In the example of FIG. 2, the person P is appearing in the image of the image area 21A. Let it be assumed that this person P is advancing toward the traveling direction a. The information processing server 100 detects the traveling direction and speed of the person P, and predicts, based on the detected traveling direction and speed, the image of the video camera 200 where that person will subsequently appear, and the appearance position thereof. The information processing server 100 selects and displays the image of the video camera 200 to be disposed in the image areas 21B to 21D consecutively in order of higher possibility.

The images of the video cameras 200 displayed in the respective image areas 21 switch continually (dynamically). For example, when the image in which the probability that the person will subsequently appear is high is changed pursuant to the movement of the person to be monitored, the information processing server 100 sequentially switches the image of the image area 21 so that the images of the video cameras 200 are arranged consecutively in order of higher possibility.

Appearance position suggestive images 23B to 23D (hereinafter collectively referred to as the "appearance position suggestive images 23") are disposed on the respective image areas 21B to 21D. The appearance position suggestive images 23 indicate the positions in the image where the person P to be monitored is likely to appear. Here, the information processing server 100 may also notify the level of possibility that the person P will appear by changing the color of or flashing the appearance position suggestive images 23 according to the appearance probability.

(1.2.2 Specific Example of Calculation Method of Appearance Probability)

Figure 3:
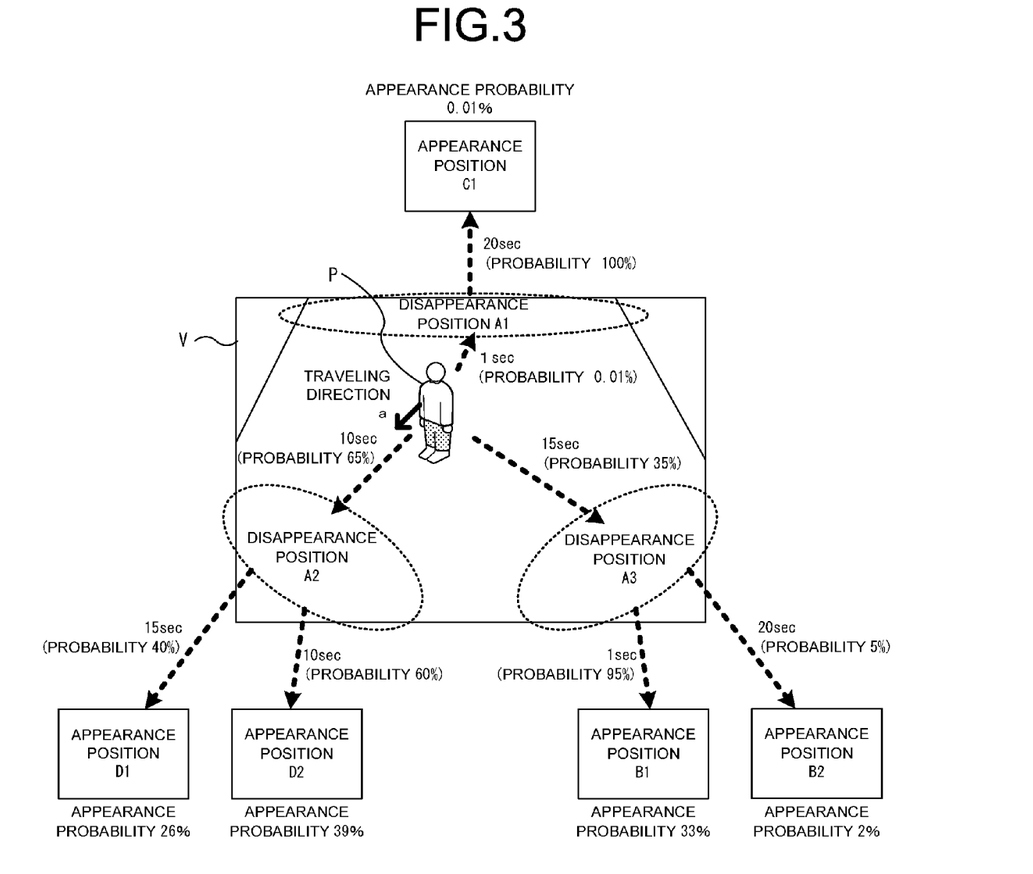
FIG. 3 is a diagram explaining a specific example of the calculation method of the appearance probability.

A specific example of the calculation method of the appearance probability of the person appearing in an imaging area (that is, a captured image) of the respective video cameras 200 is now explained with reference to FIG. 3. FIG. 3 is a diagram explaining the calculation method of the appearance probability of the person P, which is currently appearing in the image, appearing at the respective appearance positions B1, B2, C1, D1, D2 as the appearance positions in the imaging range of the video camera 200 where that person P may appear. In the example of this embodiment, the appearance probability of the person P appearing at the respective appearance position is calculated based on the following formula.

$$\text{Appearance probability} = \text{disappearance position arrival probability} \times \text{appearance position arrival probability} \quad [\text{Math 1}]$$

Here, the disappearance position arrival probability is the probability that the person P appearing in the image V will respectively disappear at (frame out from) the disappearance positions A1 to A3 that are set in advance in the image V. Moreover, the appearance position arrival probability is the probability of the person P appearing at the respective appearance positions after disappearing from the image V at any one of the disappearance positions A1 to A3.

(1.2.2.1 Disappearance Position Arrival Probability)

The disappearance position arrival probability can be calculated based on the traveling direction and speed of the person P. In the example of FIG. 3, the disappearance position arrival probability that the person P will respectively disappear at (frame out from) the disappearance position A1 to disappearance position A3 is 0.01%, 65%, and 35%, respectively. Here, the reason why the disappearance position arrival probability total exceeds 100% is because the significant figures have been set to two digits.

To explain this in further detail, the disappearance position A2 is located on a substantially extended line of the traveling direction a. Thus, the disappearance position arrival probability that the person P will head toward the disappearance position A2 is highest.

While the disappearance position A3 is not located on the substantially extended line of the traveling direction a, since it is located at the lower part of the image V as with the disappearance position A2, it is considered that the possibility that the person P will arrive at the disappearance position A3 is sufficiently high, and thus the disappearance position arrival probability is high subsequent to the disappearance position A2. The disappearance position A1 is located in a direction that is opposite to the traveling direction a. Thus, the disappearance position arrival probability of the person P appearing at the disappearance position A1 is of a sufficiently low value.

Moreover, as described above, the speed of the person P can also be considered upon calculating the disappearance position arrival probability. If the position and speed of the person P are known, it is possible to predict the time required for the person P to arrive at the respective disappearance positions A1 to A3. For example, the longer the predicted time, it can be considered that the probability that the person P will arrive at the respective disappearance positions A1 to A3 is low.

Here, the relation of the direction and speed of the person P (corresponding to the time required for the person P to arrive at the respective disappearance positions A1 to A3) and the disappearance position arrival probability may be set in advance based on an empirical rule, or statistically obtained based on the movement of the numerous persons P appearing in the image V.

(1.2.2.2 Appearance Position Arrival Probability)

The appearance position arrival probability can be calculated, for example, by statistically seeking at which appearance position the person P that disappeared from the respective disappearance positions A1 to A3 will appear. Otherwise, the appearance position arrival probability may also be set in advance as a fixed value based on based on an empirical rule.

In the example of FIG. 3, when the person P disappears from the disappearance position A1 of the image V, it can be understood that the person P will appear at the appearance position C1 with a probability of 100%. Similarly, when the person P disappears from the disappearance position A2, it can be understood that the person P will appear at the appearance position D1 with a probability of 40%, and appear at the appearance position D2 with a probability of 60%. Moreover, when the person P disappears from the disappearance position A3, it can be understood that the person P will appear at the appearance position B1 with a probability of 95%, and appear at the appearance position B2 with a probability of 5%.

Note that the time required for the person P to arrive at the respective appearance positions from the respective disappearance positions A1 to A3 can also be calculated based on the speed of the person P in the image V, and the distance between each of the predetermined disappearance positions A1 to A3 and the respective appearance positions.

(1.2.2.3 Appearance Probability)

As described above, the appearance probability of the person P at the respective appearance positions can be calculated based on the product of the disappearance position arrival probability and the appearance position arrival probability. In the example of FIG. 3, the appearance probability at the appearance position D2 is the highest at 39%, and subsequently in order of the appearance position B1 (appearance probability 33%), the appearance position D1 (appearance probability 26%), the appearance position B2 (appearance probability 2%), and the appearance position C1 (appearance probability 0.01%). Note that, because of fractions, the total appearance probability in FIG. 3 is not 100%.

(1.3 Functional Configuration of System)

Figure 4:
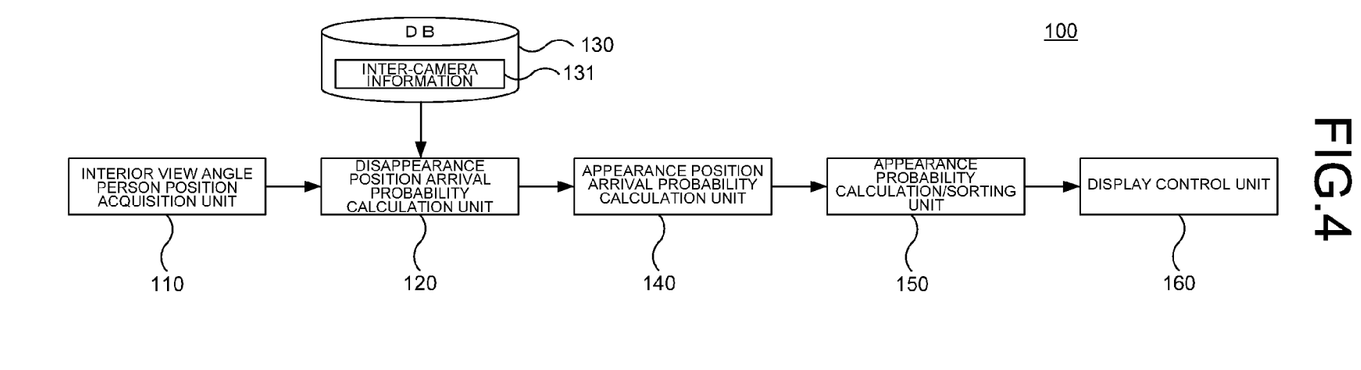
FIG. 4 is a functional block diagram showing a schematic configuration of the information processing server illustrated in FIG. 1.

Next, the functional configuration of the information processing server 100 according to this embodiment is explained with reference to FIG. 4. FIG. 4 is a functional block diagram showing the functional configuration of the information processing server 100 according to this embodiment.

As shown in FIG. 4, the information processing server 100 includes an interior view angle person position acquisition unit 110, a disappearance position arrival probability calculation unit 120, a database (DB) 130, an appearance position arrival probability calculation unit 140, an appearance probability calculation/sorting unit 150, and a display control unit 160.

The interior view angle person position acquisition unit 110 detects the position of the person P appearing in the image of the video camera 200 based on the person detection result that was input from the video camera 200. In addition, the interior view angle person position acquisition unit 110 can also calculate the traveling direction and speed of the person P by analyzing the position of the person P in a time series.

The disappearance position arrival probability calculation unit 120 calculates, for each disappearance position, the disappearance position arrival probability indicating the likelihood that the person P will disappear at which disappearance position in the image and the time required for the person P to arrive at the respective disappearance positions based on the information acquired with the interior view angle person position acquisition unit 110 and the inter-camera information 131 stored in the DB 130. Here, the inter-camera information 131 includes information of the disappearance positions set in the image of the video camera 200, and the various types of information required for the calculation of the disappearance position arrival probability. Since the calculation method of the disappearance position arrival probability was explained in foregoing "1.2.2.1", the explanation thereof is omitted.

The appearance position arrival probability calculation unit 140 calculates the probability that the person P will appear at the respective appearance positions after disappearing from the respective disappearance positions. Since the appearance position arrival probability was explained in foregoing "1.2.2.2", the explanation thereof is omitted.

The appearance probability calculation/sorting unit 150 calculates the probability that the person P will appear at the respective appearance positions based on the disappearance position arrival probability calculated with the disappearance position arrival probability calculation unit 120 and the appearance position arrival probability calculated with the appearance position arrival probability calculation unit 140. Since the calculation method of the appearance probability was explained in foregoing "1.2", the explanation thereof is omitted.

The display control unit 160 generates the monitoring screen 20 illustrated in FIG. 2 based on the appearance probability for each of the appearance positions calculated with the appearance probability calculation/sorting unit 150, and displays the monitoring screen 20 on the display device 300. As described above, with the monitoring screen 20 of FIG. 2, three images of the respective video cameras 200 are selected and arranged consecutively in order of higher appearance probability, and the appearance position in the respective image is shown with the appearance position suggestive image 23.

(1.4 Flow of Processing)

Figure 5:
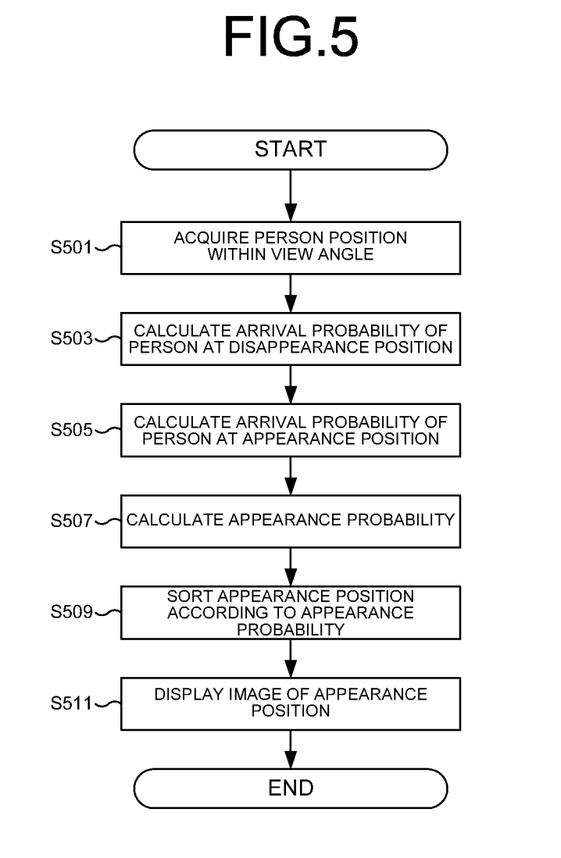
FIG. 5 is a flowchart showing the flow of processing of the information processing server illustrated in FIG. 1.

The processing flow of the information processing server 100 is now explained with reference to FIG. 5. FIG. 5 is a flowchart showing the processing flow of the information processing server 100 according to this embodiment.

Note that the respective processing steps described later may be executed by arbitrarily changing the order or in parallel to the extent that it is not inconsistent with the processing contents. Moreover, another step may be added between the respective processing steps. In addition, a step that is described as one step as a matter of convenience may also be executed by being split into a plurality of steps, and steps that are described by being split into a plurality of steps as a matter of convenience may also be executed as one step.

Foremost, the interior view angle person position acquisition unit 110 acquires the position of the person P, which is appearing in the image of the video camera 200, in the image based on the person detection result that was input from the video camera 200 (S501). Moreover, the interior view angle person position acquisition unit 110 additionally detects information such as the traveling direction and speed of the person P.

Next, the disappearance position arrival probability calculation unit 120 calculates the disappearance position arrival probability of the respective disappearance positions set in the image of the video camera 200 based on information such as the traveling direction and speed of the person P detected with the interior view angle person position acquisition unit 110 (S503). Here, the disappearance position arrival probability calculation unit 120 additionally calculates the time required for the person P to arrive at the respective disappearance positions.

When the person P disappears from the respective disappearance positions of the image of the video camera 200 where the person P is currently appearing, the appearance position arrival probability calculation unit 140 calculates the appearance position arrival probability indicating at which appearance position the person P will appear (S505).

The appearance probability calculation/sorting unit 150 respectively calculates the appearance probabilities that the person P will appear at the appearance positions of the respective video cameras 200 where the person P can subsequently appear after the video camera 200 in which the person P is currently appearing based on the disappearance position arrival probability calculated with the disappearance position arrival probability calculation unit 120 and the appearance position arrival probability calculated with the appearance position arrival probability calculation unit 140. In addition, the appearance probability calculation/sorting unit 150 rearranges (sorts) the respective appearance positions in order of higher appearance probability (S509).

The display control unit 160 presents, to the user, the appearance position in which the person P is likely to appear by using a display screen such as the monitoring screen 20 illustrated in FIG. 2 in accordance with the appearance probability calculated with the appearance probability calculation/sorting unit 150 (S511).

(1.5 Hardware Configuration)

An example of the hardware configuration in the case of realizing the foregoing information processing server 100 with a computer is now explained with reference to FIG. 6. Note that, as described above, the functions of the information processing server 100 may also be realized with a plurality of information processing apparatuses.

Figure 6:
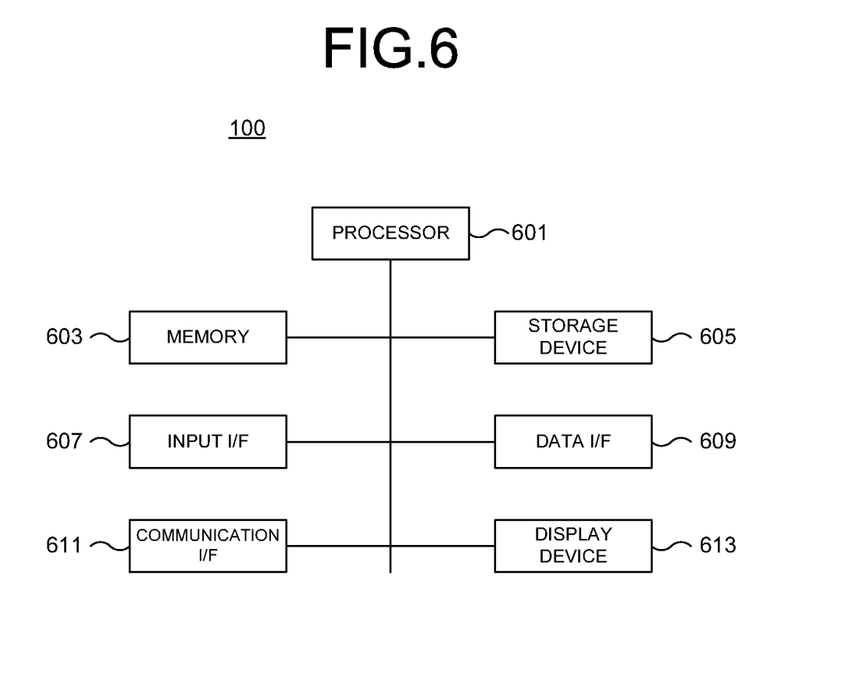
FIG. 6 is a block diagram showing a configuration of the hardware capable of mounting the information processing server illustrated in FIG. 1.

As shown in FIG. 6, the information processing server 100 includes a processor 601, a memory 603, a storage device 605, an input interface (I/F) 607, a data I/F 609, a communication I/F 611, and a display device 613.

The processor 601 controls the various types of processing in the information processing server 100 by executing the programs stored in the memory 603. For example, the processing pertaining to the interior view angle person position acquisition unit 110, the disappearance position arrival probability calculation unit 120, the appearance position arrival probability calculation unit 140, the appearance probability calculation/sorting unit 150 and the display control unit 160 explained with reference to FIG. 4 may be realized as programs that are once stored in the memory 603 and subsequently run on the processor 601.

The memory 603 is, for example, a storage medium such as a RAM (Random Access Memory). The memory 603 temporarily stores program codes of programs to be executed by the processor 601 and data that is required upon executing the programs. For example, a stack area that is required upon executing the programs is secured in the storage area of the memory 603.

The storage device 605 is, for example, a hard disk or a nonvolatile storage medium such as a flash memory. The storage device 605 stores an operating system, and various programs for realizing the interior view angle person position acquisition unit 110, the disappearance position arrival probability calculation unit 120, the appearance position arrival probability calculation unit 140, the appearance probability calculation/sorting unit 150, and the display control unit 160, and various data including the inter-camera information 131 that is stored in the DB 130. The programs and data stored in the storage device 605 are referred to by the processor 601 by being loaded into the memory 603 as needed.

The input I/F 607 is a device for receiving inputs from the user. The input device 400 explained with reference to FIG. 1 can also be realized with the input I/F 607. As a specific example of the input I/F 607, considered may be a keyboard, a mouse, a touch panel, or various sensors. The input I/F 607 may also be connected to the information processing server 100 via an interface such as a USB (Universal Serial Bus).

The data I/F 609 is a device for inputting data from the outside of the information processing server 100. As a specific example of the data I/F 609, there is a drive device for reading the data stored in the various storage mediums. The data I/F 609 may also be provided outside the information processing server 100. In the foregoing case, the data I/F 609 is connected to the information processing server 100 via an interface such as a USB.

The communication I/F 611 is a device for communicating data via wired or wireless communication with a device; for instance, the video camera 200 or the like, that is outside the information processing server 100. The communication I/F 611 may also be provided outside the information processing server 100. In the foregoing case, the communication I/F 611 is connected to the information processing server 100 via an interface such as a USB.

The display device 613 is a device for displaying various types of information. The display device 300 explained with reference to FIG. 1 may also be realized with the display device 613. As a specific example of the display device 613, considered may be, for example, a liquid crystal display or an organic EL (Electro-Luminescence) display. The display device 613 may also be provided outside the information processing server 100. In the foregoing case, the display device 613 is connected to the information processing server 100 via a display cable or the like.

(1.6 Effect of this Embodiment)

As described above, with the monitoring system 1 according to this embodiment, the appearance position that the person to be monitored will subsequently appear (image captured with the video camera 200 in which the person will subsequently appear and the position that the person will appear in that image) is predicted while the person is still appearing in an image of the video camera 200. Furthermore, the user's monitoring load can be alleviated since the monitoring system 1 presents to the user, based on the foregoing prediction, the image of the video camera 200 in which the person is more likely to appear than the other video cameras 200 and the appearance position thereof. In other words, the monitoring system 1 can suitably predict an image of the video camera 200 in which a moving body appearing in the video camera 200 will subsequently appear.

2 Second Embodiment

Figure 7:
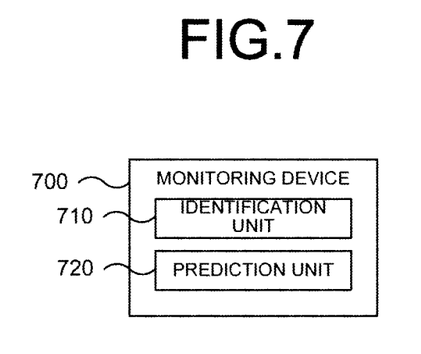
FIG. 7 is a functional block diagram showing a schematic configuration of the monitoring device according to the second embodiment.

The second embodiment is now explained with reference to FIG. 7. FIG. 7 is a block diagram showing the functional configuration of a monitoring device 700 as an information processing system. As shown in FIG. 7, the monitoring device 700 includes an identification unit 710 and a prediction unit 720.

The identification unit 710 identifies the traveling direction of the moving body appearing in a image of a certain video camera (hereinafter referred to as the "first video camera" in this section) among a plurality of video cameras not shown. Here, as specific examples of a moving body, in addition to a person, considered may be an automobile, a bicycle, or a motorcycle.

The prediction unit 720 predicts, based on the traveling direction of the moving body in the image of the first video camera, one or more video cameras (hereinafter referred to as the "second video cameras") in which a possibility of the moving body appearing in the image of the first video camera subsequently appearing is higher than other video cameras among.

As a result of adopting the foregoing configuration, according to the monitoring device 700 of this embodiment, it is possible to suitably predict a image of a video camera in which a moving body appearing in a video camera will subsequently appear when tracking a person with a plurality of video cameras.

3 Supplementary Information

Note that the configuration of the foregoing embodiments may be combined or partially replaced. Moreover, the configuration of the present invention is not limited to the foregoing embodiments, and may be variously modified to the extent that the modification does not deviate from the gist of the present invention.

Note that a part or the hole of each of the foregoing embodiments may also be described as per, but are not limited to, the following notes. Moreover, the program of the present invention will suffice so as long as it is a program that causes a computer to execute the respective operations explained in each of the foregoing embodiments.

Further Exemplary Embodiment 1

An information processing system, comprising: identification means for identifying a traveling direction of a moving body appearing in a image of a first video camera among a plurality of video cameras; and prediction means for predicting, based on the traveling direction of the moving body in the image of the first video camera, one or more second video cameras in which a possibility of the moving body that is appearing in the image of the first video camera subsequently appearing is higher than other video cameras among the plurality of video cameras.

Further Exemplary Embodiment 2

The information processing system of further exemplary embodiment 1, wherein the prediction means determines a first probability of the moving body heading toward each disappearance position in the image, based on the traveling direction of the moving body in the image of the first video camera, and predicts the second video camera, based on a second probability in which the moving body heads to an imaging position of another video camera from each disappearance position, and also based on the first probability.

Further Exemplary Embodiment 3

The information processing system of further exemplary embodiment 1 or 2, further comprising: display control means for displaying on a display device images of the plurality of second video cameras, which are predicted by the prediction means, consecutively starting from the image of the second video camera in which a possibility of the moving body appearing next is highest.

Further Exemplary Embodiment 4

The information processing system of any one of further exemplary embodiments 1 to 3, wherein the identification means identifies a traveling direction and speed of the moving body, and the prediction means predicts the second video camera based on the traveling direction and speed of the moving body.

Further Exemplary Embodiment 5

The information processing system of any one of further exemplary embodiments 1 to 4, wherein the prediction means predicts an appearance position of the moving body in the image of the second video camera.

Further Exemplary Embodiment 6

An image processing method performed by an image processing system, the method comprising a step of: identifying a traveling direction of a moving body appearing in a image of a first video camera among a plurality of video cameras; and a step of predicting, based on the traveling direction of the moving body in the image of the first video camera, one or more second video cameras in which a possibility of the moving body that is appearing in the image of the first video camera subsequently appearing is higher than other video cameras among the plurality of video cameras.

Further Exemplary Embodiment 7

The information processing method of further exemplary embodiment 6, wherein a first probability of the moving body heading toward each disappearance position in the image is determined based on the traveling direction of the moving body in the image of the first video camera, and the second video camera is predicted based on a second probability in which the moving body1 heads to an imaging position of another video camera from each disappearance position, and also based on the first probability.

Further Exemplary Embodiment 8

The information processing method of further exemplary embodiment 6 or 7, further comprising a step of displaying on a display device images of the plurality of second video cameras, which are predicted by the prediction means, consecutively starting from the image of the second video camera in which a possibility of the moving body appearing next is highest.

Further Exemplary Embodiment 9

The information processing method of any one of further exemplary embodiment 6 to 8, wherein the second video camera is predicted based on a traveling direction and speed of the moving body.

Further Exemplary Embodiment 10

The information processing method of any one of further exemplary embodiment 6 to 9, wherein an appearance position of the moving body in the image of the second video camera is predicted.

Further Exemplary Embodiment 11

A program for causing a computer to execute: processing of identifying a traveling direction of a moving body appearing in a image of a first video camera among a plurality of video cameras; and processing of predicting, based on the traveling direction of the moving body in the image of the first video camera, one or more second video cameras in which a possibility of the moving body that is appearing in the image of the first video camera subsequently appearing is higher than other video cameras among the plurality of video cameras.

Further Exemplary Embodiment 12

The program of further exemplary embodiment 11, wherein a first probability of the moving body heading toward each disappearance position in the image is determined based on the traveling direction of the moving body in the image of the first video camera, and the second video camera is predicted based on a second probability in which the moving body heads to an imaging position of another video camera from each disappearance position, and also based on the first probability.

Further Exemplary Embodiment 13

The program of further exemplary embodiment 11 or 12, wherein the program causes a computer to further execute processing of displaying on a display device images of the plurality of second video cameras, which are predicted by the prediction means, consecutively starting from the image of the second video camera in which a possibility of the moving body appearing next is highest.

Further Exemplary Embodiment 14

The program of any one of further exemplary embodiments 11 to 13, wherein the second video camera is predicted based on a traveling direction and speed of the moving body.

Further Exemplary Embodiment 15

The program of any one of further exemplary embodiments 11 to 14, wherein an appearance position of the moving body in the image of the second video camera is predicted.

This application relates to and claims priority from Japanese Patent Application No. 2012-231086, filed on Oct. 18, 2012, the entire disclosure of which is incorporated herein by reference.

1 . . . monitoring system, 20 . . . monitoring screen, 21 . . . image area, 23 . . . appearance position suggestive image, 100 . . . information processing server, 110 . . . interior view angle person position acquisition unit, 120 . . . disappearance position arrival probability calculation unit, 130 . . . database, 131 . . . inter-camera information, 140 . . . appearance position arrival probability calculation unit, 150 . . . appearance probability calculation/sorting unit, 160 . . . display control unit, 200 . . . video camera, 300 . . . display device, 400 . . . input device, 601 . . . processor, 603 . . . memory, 605 . . . storage device, 607 . . . input interface, 609 . . . data interface, 611 . . . communication interface, 613 . . . display device, 700 . . . monitoring device, 710 . . . identification unit, 720 . . . prediction unit

I claim:

1. An information processing system, comprising:
a tangible, non-transitory computer-readable medium storing computer-executable instructions; and
one or more processors configured to execute the instructions to:
identify a traveling direction of an object appearing in an image of a first video camera of a plurality of video cameras;
determine a first set of probabilities of the object heading toward a plurality of disappearance positions in the image, based on the identified traveling direction of the object in the image of the first video camera; and
predict, based on the first set of probabilities, one or more second video cameras of the plurality of video cameras for which an appearance probability of the object appearing is higher than appearance probabilities for the remaining of the plurality of video cameras.

2. The information processing system of claim 1, wherein the one or more processors are configured to execute the instructions to predict the one or more second video cameras, further based on a second probability of the object heading toward an imaging position of another video camera of the plurality of video cameras from the each disappearance positions.

3. The information processing system of claim 1, wherein the one or more processors are configured to execute the instructions to:
display on a display device images of the one or more second video cameras in an order starting from an image of one of the one or more second video cameras for which the appearance probability of the object appearing next is highest.

4. The information processing system of claim 1, wherein the one or more processors are configured to execute the instructions to:
identify the traveling direction and a speed of the object, and
predict the one or more second video cameras based on the traveling direction and the speed.

5. The information processing system of claim 1, wherein the one or more processors are configured to execute the instructions to predict an appearance position of the object in the image of the one or more second video cameras.

6. An image processing method performed by an image processing system, the method comprising:
identifying a traveling direction of an object appearing in an image of a first video camera of a plurality of video cameras;
determining a first set of probabilities of the object heading toward a plurality of disappearance positions in the image, based on the identified traveling direction of the object in the image of the first video camera; and
predicting, based on the first set of probabilities, one or more second video cameras of the plurality of video cameras for which an appearance probability of the object appearing is higher than appearance probabilities for the remaining of the plurality of video cameras.

7. A tangible, non-transitory computer-readable medium storing computer-executable instructions that, when executed by a processor, cause the processor to execute a method comprising:
identifying a traveling direction of an object appearing in an image of a first video camera of a plurality of video cameras;
determining a first set of probabilities of the object heading toward a plurality of disappearance positions in the image, based on the traveling direction of the object in the image of the first video camera; and
predicting, based on the first set of probabilities, one or more second video cameras of the plurality of video cameras for which an appearance probability of the object appearing is higher than appearance probabilities for the remaining of the plurality of video cameras.

8. An information processing system, comprising:
a tangible, non-transitory computer-readable medium storing computer-executable instructions; and
a processor configured to execute the instructions to perform a method comprising:
identifying a traveling direction of an object appearing in an image of a first video camera among a plurality of video cameras;
determining a first set of probabilities of the object heading toward a plurality of disappearance positions in the image, based on the identified traveling direction of the object in the image of the first video camera; and
predicting, based on the first set of probabilities a second video camera for which a probability of the object appearing is higher than appearance probabilities for the remaining of the plurality of video cameras.

9. The information processing system of claim 1, wherein the one or more processors are configured to execute the instructions to display on a display device images of the one or more second video cameras based on the first probability, and switch the images when the image in which the appearance probability is highest is changed pursuant to the movement of the object.

10. The information processing system of claim 1, wherein the object comprises a moving body.

11. The information processing system of claim 10, wherein the moving body comprises at least one of an automobile, a bicycle, a motorcycle, and a person.

12. The information processing method of claim 6, further comprising predicting the one or more second video cameras based on a second probability of the object heading toward an imaging position of another video camera of the plurality of video cameras from each disappearance position.

13. The information processing method of claim 6, further comprising displaying on a display device images of the one or more second video cameras in an order starting from an image of one of the one or more second video cameras for which a probability of the object appearing next is highest.

14. The information processing method of claim 6, further comprising identifying the traveling direction and speed of the object, and predicting the one or more second video cameras based on the traveling direction and the speed.

15. The information processing method of claim 6, further comprising predicting an appearance position of the object in the image of the one or more second video cameras.

16. The information processing method of claim 6, wherein the object comprises a moving body.

17. The information processing method of claim 6, further comprising displaying an appearance position suggestive image on an image of one of the plurality of video cameras to indicate where in the image the object is likely to appear.

18. The information processing method of claim 17, further comprising at least one of changing the color of and flashing the displayed appearance position suggestive image.

19. The information processing method of claim 6, further comprising identifying the traveling direction and speed of the object, and predicting an appearance position of the object in one or more images of the one or more second video cameras based on the traveling direction and the speed.

20. The tangible, non-transitory computer-readable medium of claim 7, wherein the object comprises a moving body.

* * * * *